No. 786,989. PATENTED APR. 11, 1905.
L. PFINGST.
COMPOUND GEARED BRAKE SPINDLE AND RATCHET HANDLE.
APPLICATION FILED DEC. 9, 1903.
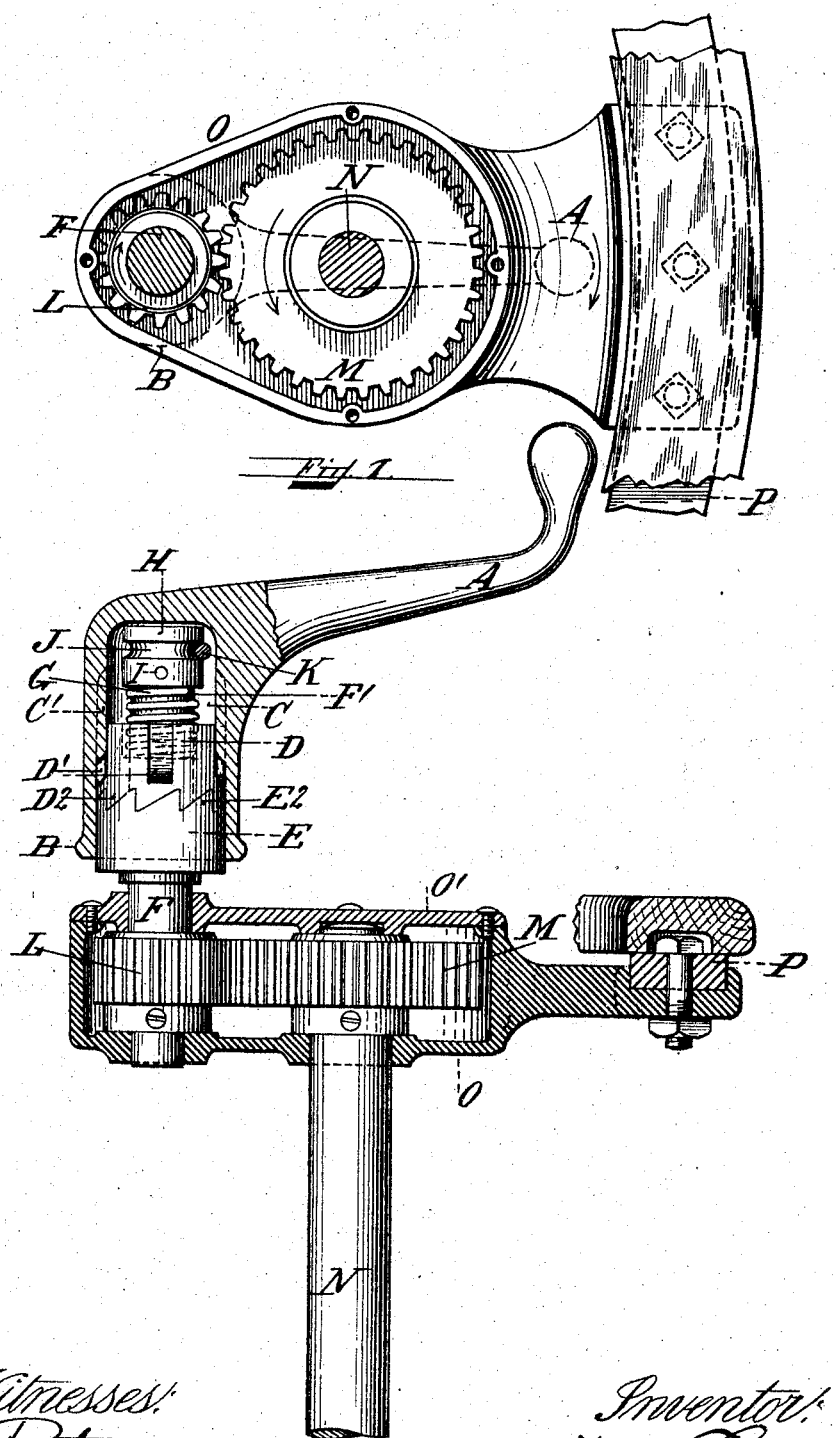

No. 786,989. Patented April 11, 1905.

UNITED STATES PATENT OFFICE.

LOUIS PFINGST, OF NEW DORCHESTER, MASSACHUSETTS.

COMPOUND-GEARED BRAKE-SPINDLE AND RATCHET-HANDLE.

SPECIFICATION forming part of Letters Patent No. 786,989, dated April 11, 1905.

Application filed December 9, 1903. Serial No. 184,434.

*To all whom it may concern:*

Be it known that I, LOUIS PFINGST, a citizen of the United States of America, and a resident of New Dorchester, in the county of Suffolk and State of Massachusetts, have invented certain new and useful Improvements in Compound-Geared Brake-Spindles and Ratchet-Handles, of which the following is a specification.

My invention relates to improvements in brake mechanism for controlling the speed of cars on street-railways, which I term a "compound-geared brake-spindle and ratchet-handle."

The objects of my improvements are, first, to secure increased leverage to rotate the brake-spindle; second, to multiply the applied power upon the car-brake rigging; third, to economize the space upon the platform, and, fourth, to provide efficient mechanism conveniently accessible to obtain greater power manually applied. I attain these objects through the improved mechanism illustrated in the annexed drawings, forming a part of this specification, wherein—

Figure 1 denotes a plan of the bracket and gear-case with its cover removed exhibiting the multiplying-gears, with the shaft and spindle in transverse section and the rotative brake-handle in dotted lines. Fig. 2 illustrates a vertical central section through the brake-handle and gear-case, exposing in elevation the construction therein contained.

Corresponding letters of reference indicate similar features throughout the drawings, referring to which—

A designates the car-brake handle, and B the shank thereof, having a chamber or recess C accessible through the bottom of the shank. This chamber is provided with vertical projecting ribs C', which enter the peripheral grooves D', formed in the upper female clutch member D, which is actuated by said brake-handle A. The coacting male ratchet clutch member E engages with the upper clutch member D through the medium of the serrations or teeth $D^2$ $E^2$, formed upon the contiguous surfaces of each clutch member, as shown. The depending stub-shaft F, Fig. 2, forms an integral part of the clutch E and also forms the upward extension F', which carries loosely the supplemental clutch member D, forced in temporary engagement by the helical spring G, embracing said extension and secured thereon by the collar H through the pin I. A circumferential groove J on said collar receives the locking-pin K, passing through and securing the brake-handle A to the extension F', thus allowing the rotation of said handle, together with the clutch member D, either to the right or left, while preventing the liberation of the handle from its contained accessories.

To the ratchet-clutch shaft F is attached the pinion L, which engages with and transmits motion to the spur-gear M, secured to the upper end of the chain-winding spindle N, through which the power manually applied to the brake-handle A and its described coacting accessories is conveyed by the attached chain and rod forming a part of the ordinary brake-rigging (not necessary to illustrate) to the car-wheels, and thus applies or releases the brake-shoes.

O designates the gear-case, which also forms the bracket supporting the brake-handle A and the upper end of the chain-winding spindle N and which is secured to the car-dasher rail P, substantially as illustrated.

O' represents the cover of the gear-case, which additionally with said case forms bearings for the shaft and spindle when the devices are organized.

The conservation of power, with an added efficiency in its application, together with the facility of assembling or reëstablishment of worn parts should replacement become necessary will be obvious in this car-brake equipment.

In the practical operation of my improved invention, premising the brake is off, with the brake-rigging relaxed, the power is manually applied by rotating the brake-handle to the right and taking up the slack of the brake-rigging with substantially one revolution. Additional power is now applied by reciprocating the brake-handle rapidly, the proportion of the gears manifestly augmenting the efficiency of the brake-shoes in their applied friction to the car-wheels, the stored power being temporarily held through the instrumentality of the ordinary ratchet on the lower half of the chain-spindle and the attendant holdback-pawl on the car-platform, thus keeping the brakes on until the interval of their release, when the mechanism returns, assisted by the impetus of the brake-springs and the disunion of the clutches, to its normal position.

Having ascertained the preferred construction and operation of my improved invention, I do not confine myself to the details herein defined, but may variously modify the same without departing from the spirit of my invention.

I claim—

1. In a car-brake manually operated, a rotatable spindle adapted to apply and release the car-brake rigging provided at its upper end with a spur-gear, and means on its lower end for the attachment of a chain and rod, a pinion engaging with said gear, a shaft supporting said pinion terminating in a clutch having an extension, a rotatable handle, a chamber in said handle integrally provided with projecting ribs, means actuated by said ribs to receive and transmit motion to the spindle, a fixed collar supported on said extension and having a circumferential groove, means to secure temporary engagement of the clutch members and means to confine the rotatable handle to said extension to permit right and left rotation while preventing liberation of said handle from its contained accessories.

2. A chain-winding spindle attached to a car-platform and having a fixed gear, a pinion coacting therein to actuate said gear, a lower clutch member provided with a stub-shaft supporting said pinion, a supplemental clutch member adapted to operate the lower clutch and its attendant pinion, and means integral with the brake-handle to operate the assembled clutch members to apply or release the brake-shoes for the purpose set forth.

3. A clutch member provided with a stub-shaft, means on said shaft to transmit an applied power, a chain-winding spindle having means to receive motion from said stub-shaft, a supplemental clutch member having peripheral grooves and a brake-handle provided with means to engage with said grooves and thus convey the power manually applied to operate the car-brake rigging.

4. In combination with a brake-handle having a chambered shank provided with vertical projecting ribs, a female member having peripheral grooves, a male member having an extension at its upper end arranged to support said female member and means embracing the extension to secure temporary engagement of said members collectively forming the ratchet-clutch, a clutch-shaft having a fixed pinion thereon and means coacting with said pinion and secured to the spindle to actuate it to control the car-brake.

5. The herein-described appliances constituting a brake for street-cars comprising a rotatable chambered handle, a ratchet-clutch within said handle and actuated thereby and a pair of multiplying-gears connected and arranged to transmit motion from the organized clutch through the chain-spindle to the brake-rigging, in combination therewith a gear-case having bearings for said gears and further adapted as a bracket to support the spindle and its accessories from the car-dasher rail as specified.

Signed at Boston, Massachusetts, this 7th day of December, 1903.

LOUIS PFINGST.

Witnesses:
GEORGE H. REISS,
WILLIAM W. DOHUT.